(12) United States Patent
Michaels et al.

(10) Patent No.: US 11,619,254 B2
(45) Date of Patent: Apr. 4, 2023

(54) PROTECTIVE COVERS FOR WELD-ON FASTENERS AND WELDING PROCESSES USING COVER-PROTECTED WELD-ON FASTENERS

(71) Applicant: GM GLOBAL TECHNOLOGY OPERATIONS LLC, Detroit, MI (US)

(72) Inventors: Christopher A. Michaels, Milford, MI (US); Lu Wang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 4 days.

(21) Appl. No.: 17/358,177

(22) Filed: Jun. 25, 2021

(65) Prior Publication Data

US 2022/0410983 A1 Dec. 29, 2022

(51) Int. Cl.
  *F16B 37/06* (2006.01)
  *B62D 27/02* (2006.01)
  *B62D 29/04* (2006.01)
  *B62D 29/00* (2006.01)
  *B62D 25/06* (2006.01)

(52) U.S. Cl.
  CPC ............ *F16B 37/061* (2013.01); *B62D 25/06* (2013.01); *B62D 27/023* (2013.01); *B62D 29/008* (2013.01); *B62D 29/043* (2013.01); *F16B 2200/50* (2018.08)

(58) Field of Classification Search
  CPC .................................................... F16B 37/061
  USPC ......................................... 411/171, 429–431
  See application file for complete search history.

(56) References Cited

U.S. PATENT DOCUMENTS

| | | | | |
|---|---|---|---|---|
| 1,941,175 A | * | 12/1933 | Johnson | F16B 37/14 |
| | | | | 29/520 |
| 4,875,817 A | * | 10/1989 | Suzumura | F16B 37/14 |
| | | | | 411/429 |
| 5,446,957 A | * | 9/1995 | Wu | B62D 25/24 |
| | | | | 29/527.1 |
| 5,508,488 A | | 4/1996 | Aoyama et al. | |

(Continued)

FOREIGN PATENT DOCUMENTS

| | | | | |
|---|---|---|---|---|
| CN | 206860641 U | * | 1/2018 | |
| DE | 2402323 A | * | 7/1975 | ............. F16B 33/06 |
| DE | 102007021132 B4 | * | 1/2009 | ............ F16B 37/061 |

*Primary Examiner* — Dennis H Redder
(74) *Attorney, Agent, or Firm* — Quinn IP Law (57) ABSTRACT

Presented are protective covers for weldable fasteners, methods for making/using such cover-protected weldable fasteners, and motor vehicles with such covered fasteners welded to load-bearing structural members. A weldable fastener assembly includes a fastener, such as a weld-on nut or clip retainer, that is fabricated with a shank and a flange. One end of the shank has a fastener hole that receives therethrough a mating fastener, such as a bolt, screw, stud, or clip. The flange is formed, in whole or in part, from a weldable material for welding to a load-bearing panel or other structural support member. The flange may be integrally formed with and project radially outward from the shank. A protective cover is attached to the flange and covers the fastener hole. The protective cover is frangible and formed, in whole or in part, from a material designed to withstand the temperature at which the weldable material melts.

20 Claims, 3 Drawing Sheets

(56) References Cited

U.S. PATENT DOCUMENTS

| | | | |
|---|---|---|---|
| 6,183,181 B1 * | 2/2001 | Leistner | F16B 33/004 |
| | | | 411/429 |
| 6,765,171 B1 | 7/2004 | Hengel et al. | |
| 7,195,436 B1 * | 3/2007 | Stephen | F16B 11/006 |
| | | | 411/376 |
| 7,645,105 B2 | 1/2010 | Hengel et al. | |
| 8,403,019 B2 | 3/2013 | Khakhalev | |
| 8,448,405 B2 | 5/2013 | Schaefer et al. | |
| 8,485,910 B2 * | 7/2013 | Selle | B23K 11/14 |
| | | | 470/22 |
| 9,375,800 B2 * | 6/2016 | Sandoz | F16B 37/061 |
| 10,632,561 B2 | 4/2020 | Smith et al. | |
| 2004/0149693 A1 | 8/2004 | Hengel et al. | |
| 2008/0193255 A1 | 8/2008 | Hengel et al. | |
| 2008/0290070 A1 | 11/2008 | Fleming et al. | |
| 2019/0126402 A1 | 5/2019 | David et al. | |

\* cited by examiner

PROTECTIVE COVERS FOR WELD-ON FASTENERS AND WELDING PROCESSES USING COVER-PROTECTED WELD-ON FASTENERS

INTRODUCTION

The present disclosure relates generally to welding techniques for joining fasteners to workpieces. More specifically, aspects of this disclosure relate to features for protecting open-hole threaded fasteners before and during welding to metallic structures.

Welding is a fabrication and repair process that bonds materials, such as metals or thermoplastics, by causing coalescence—the process by which two separate units or adjacent sections of a single unit grow together, fuse, or merge into a cohesive structure. In a joining operation, for example, two workpieces may be juxtaposed in abutting side-by-side relation and then fused together by liquefying or plasticizing (softening without liquefying) the interface areas. Workpiece liquefaction/plasticization may be achieved through the application of heat, electric arc, electron beam, ultrasound, pressure, friction, or any combination thereof to the joining region. For non-autogenous welding techniques, a filler material is added and melted to form a localized pool of molten material (a "weld puddle"). Promoting coalescence of the liquefied or plasticized materials and subsequently allowing the coalesced materials to cool will solidify the bond. Welding can be used, for example, to permanently join two or more workpieces, to operate on a single workpiece (e.g., to repair a crack or join two segments), and to cut or pierce a workpiece.

In many industries, including the manufacture of automobiles, a fastener may be welded to a sheet metal panel or other structural member to provide a coupling point for attaching a component. For instance, an internally threaded, open-hole fastener (colloquially a "weld nut" or "weld-on nut") includes an integral mounting flange that is fabricated from a fusible material for welding to a surface of a metal panel. A pair of counter-acting weld electrodes hold the weld nut and workpiece together at a joining region with the flange pressing against the workpiece surface. A controlled power source delivers high-amperage or rectified current through the facing electrodes, interposed nut flange, and workpiece to melt the flange. When the current flow is stopped, the melt solidifies and the flange is fused to the workpiece. During the manufacturing process, weld nuts may experience contaminants from weld flash expulsion, electrolytic coating, and paint; these contaminants may cause thread damage or prevent a mating fastener from securely threading into the nut.

SUMMARY

Presented herein are protective covers for weldable fasteners, methods for making and methods for using such cover-protected weldable fasteners, and motor vehicles with such covered fasteners welded to load-bearing structural members. In a non-limiting example, an internally threaded, open-hole fastener is provided with a protective cover, such as a tape, foil, integral membrane, or cap, that closes off and, optionally, seals the fastener's bolt-receiving hole to prevent the inadvertent ingress of contaminants. For open-ended weld nuts with an internally threaded through-hole, a single cover or a pair of protective covers may close off one or both open ends of the weld nut. The protective cover's material and dimensions may be engineered to survive welding, painting, furnace heating, and/or plating processes yet be readily pierced by a complementary male fastener (e.g., a bolt) when mated to the weld nut. For instance, the protective cover may include or consist essentially of a thin (e.g., 3-8 mil or 0.08-0.20 mm) polyamide, aluminum, or Teflon sheet that extends across the bolt hole and is bonded, clinched, crimped, or tap welded to the weld nut's mounting flange. The diameter of the protective cover may be less than the diameter of the weld nut flange such that the cover sits flush on a top face of the flange. Alternatively, the protective cover's diameter may be greater than the weld nut flange's diameter such that the cover conceals the top face while sitting flush against and affixing to the outer circumference of the flange.

Attendant benefits for at least some of the disclosed concepts include protective covers for weld-on fasteners that preclude corruption of internal fastener features without degrading the pre-processing, welding, and subsequent mating of the weld-on fasteners. Commercially available options for addressing weld nut contamination, including in-process rubber plugs, thread-on caps, disposable threaded inserts, and specially designed "paint cutting" fasteners, are costly, add non-value work, and have various quality and environmental drawbacks. By comparison, disclosed cover-protected weld nuts help to prevent accidental contamination of the internal threads while avoiding plant downtime to tap or replace a contaminated fastener and mitigating the unnecessary introduction of in-process parts to the waste stream. In so doing, these covered weld nuts help to abate part costs and reduce waste, as well as simplify any requisite coating, painting and welding processes with concomitant savings in manufacturing cost and time.

Aspects of this disclosure are directed to protective coverings for weldable fasteners. By way of example, a representative weldable fastener assembly includes a fastener, such as a weld-on nut, push nut, rivet nut, bracket, clip retainer, etc., that is fabricated with a shank and a flange. One end of the shank has a fastener hole that receives therethrough a mating fastener, such as a bolt, screw, stud, pin, clip, rivet, etc. The flange is formed, in whole or in part, from a weldable material for welding to a load-bearing panel or other structural support member. The flange projects transversely from the shank and may extend continuously or discontinuously around the fastener hole. A protective cover is attached to the flange and covers the fastener hole. This protective cover is frangible and formed, in whole or in part, from a material that can withstand the welding temperature at which the weldable material melts yet be punctured, e.g., by insertion of the mating fastener, or torn away, e.g., manually by a user. Disclosed fastener assemblies may be employed in automotive and non-automotive applications alike.

Additional aspects of this disclosure are directed to motor vehicles with cover-protected fasteners that are welded to load-bearing structural members, such as a body panel, roof bow, chassis rail, accessory/peripheral component interface, etc. As used herein, the terms "vehicle" and "motor vehicle" may be used interchangeably and synonymously to include any relevant vehicle platform, such as passenger vehicles (ICE, HEV, FEV, FCH, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with a passenger compartment, multiple road wheels rotatably mounted to the vehicle body (e.g., via a unibody chassis or body-on-frame chassis), and other standard original equipment. Also attached to the vehicle body is a prime mover, which may be in the nature of an engine assembly that operates alone (e.g., for ICE powertrains) or in conjunction with one or more electric traction motors (e.g., for hybrid electric powertrains) to selectively drive one or more of the road wheels to thereby propel the vehicle.

Continuing with the discussion of the above example, the vehicle also includes one or more weldable fastener assemblies. Each weldable fastener assembly includes a weld nut with a protective cover. The weld nut includes an internally threaded shank with a proximal end thereof having a fastener hole for receiving therethrough a mating bolt. A toroidal flange, which projects radially outward from the proximal end of the shank, is formed with a weldable material that is welded to the load-bearing structural member. The protective cover is mounted directly onto the fastener flange and covers the fastener hole. The protective cover is frangible and formed with a material designed to withstand the welding temperature at which the weldable material melts yet be readily pierced by insertion of the mating bolt into the fastener hole.

Other aspects of this disclosure are directed to manufacturing processes, control logic, and computer-readable media (CRM) for making or using any of the disclosed protective covers, weldable fastener assemblies, and/or motor vehicles. In an example, a method is presented for manufacturing a weldable fastener assembly. This representative method includes, in any order and in any combination with any of the above and below disclosed options and features: forming a fastener including a shank and a flange, the shank having a first end defining a fastener hole configured to receive therethrough a mating fastener, and the flange formed with a weldable material and projecting transversely from the shank; and attaching a protective cover to the flange to thereby cover the fastener hole, the protective cover is frangible and formed with a material configured to withstand a welding temperature at which melts the weldable material of the flange.

For any of the disclosed fastener assemblies, vehicles, and methods, the fastener flange has a diameter/width that is greater than a diameter/width of the protective cover. In this instance, the flange may be a toroid with opposing axial faces and an outer-diameter (OD) surface adjoined with and connecting the axial faces; the protective cover sits flush against a proximal axial face. The flange may include an annular weld projection that protrudes axially from the proximal axial face and circumscribes the fastener hole; the protective cover's diameter may be less than the weld projection's diameter. As yet a further option, an annular rim protrudes axially from the flange's proximal axial face and circumscribes the fastener hole in adjoining relation thereto. In this instance, the diameter of the annular rim is less than the diameters of both the protective cover and the weld projection such that the protective cover extends across and covers the annular rim.

For any of the disclosed fastener assemblies, vehicles, and methods, the fastener flange has a diameter/width that is less than a diameter/width of the protective cover. In this instance, the flange may be a toroid with opposing axial faces and an outer-diameter (OD) surface adjoined with and connecting the axial faces; the protective cover extends across the entire proximal axial face and mounts directly to the outer radial surface of the flange. In this instance, the flange further may also include an annular weld projection that protrudes axially from the proximal axial face and circumscribes the fastener hole; the protective cover's diameter may be greater than the weld projection's diameter.

For any of the disclosed fastener assemblies, vehicles, and methods, the protective cover is mounted directly onto the flange via an adhesive, a crimp, a tap weld, and/or a clinch joint. It may be desirable that the protective cover lack threads yet have a direct physical attachment to the flange as opposed to merely sitting inside the shank bore. As yet a further option, the protective cover may be formed with a polyamide, aluminum, and/or polytetrafluoroethylene (PTFE) material. Moreover, the protective cover may include or consist essentially of a foil, sheet, membrane, or tape with a thickness of about 2 mil to about 8 mil or, in at least some embodiments, less than about 4 mil.

For any of the disclosed fastener assemblies, vehicles, and methods, the fastener, including the shank and flange, is integrally formed as a single-piece structure from the weldable material. It may be desirable that the fastener be formed in its entirety from an aluminum or steel material, or alloys thereof; the weldable material may be substantially identical to the material composition of the load-bearing support structure to which the fastener is being welded. Additionally, the fastener may be a weld nut with a shank that is an elongated right-circular cylinder defining therein an internally threaded bore. In this instance, the flange may be a toroid that projects radially outward from the proximal end of the shank and extends continuously around the fastener hole.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
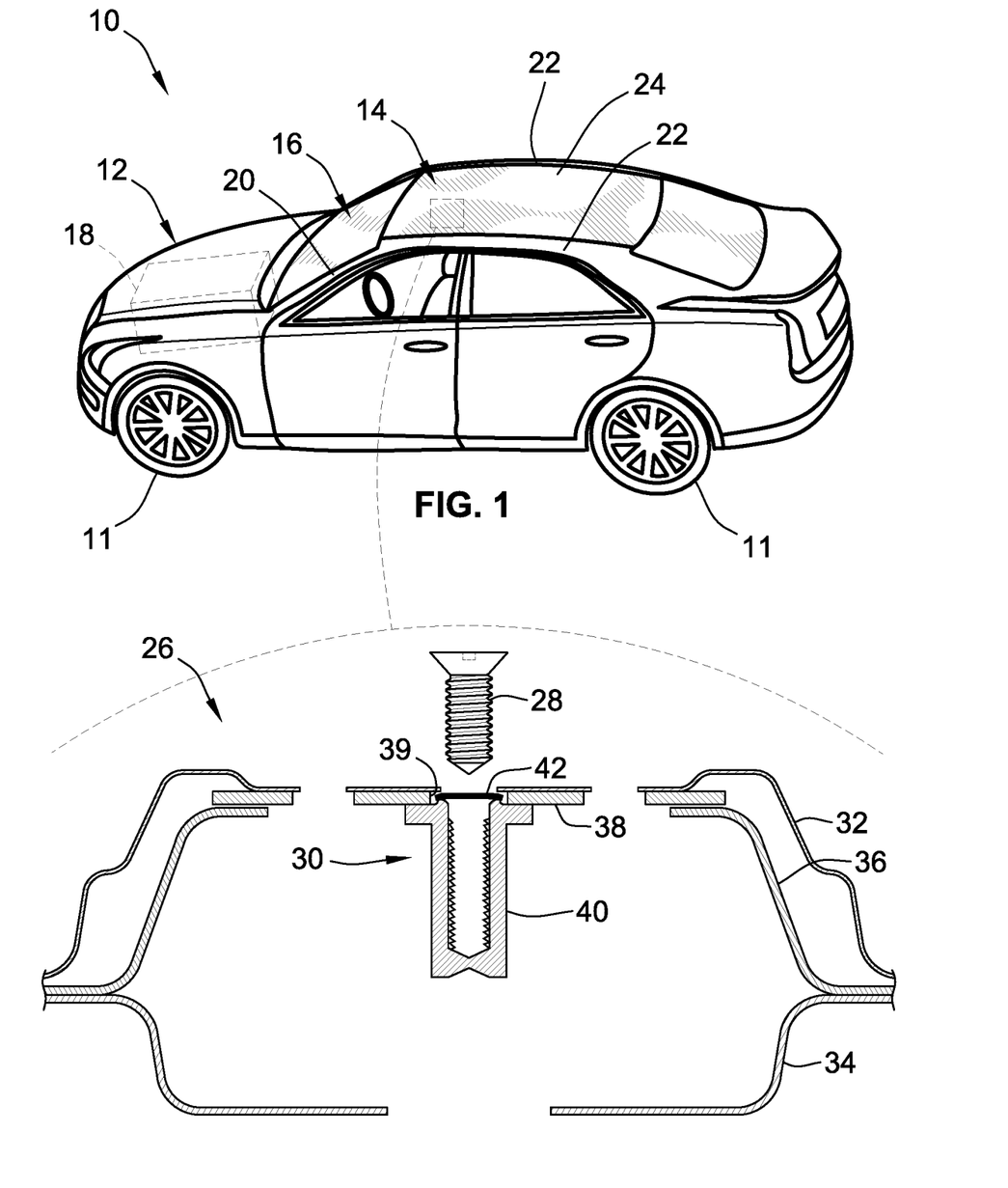
FIG. 1 is an elevated, perspective-view illustration of a representative motor vehicle with an inset view of a vehicle roof bow shown in cross-section to illustrate a roof rack bolt pierce a protective cover of a weld-on rack receiver nut in accordance with aspects of the present disclosure.

Referring now to the drawings, wherein like reference numbers refer to like features throughout the several views, there is shown in FIG. 1 a perspective-view illustration of a representative automobile, which is designated generally at 10 and portrayed herein for purposes of discussion as a sedan-style passenger vehicle with a panoramic "glass roof" assembly. The illustrated automobile 10—also referred to herein as "motor vehicle" or "vehicle" for short—is merely an exemplary application with which novel features of this disclosure may be practiced. In the same vein, incorporation of the present concepts into a weldable rack receiver nut for bolting on a vehicle roof rack should also be appreciated as an exemplary implementation of some of the novel concepts disclosed herein. As such, it will be understood that aspects and features of the present disclosure may be applied to other weld-on fasteners, may be incorporated into any logically relevant type of motor vehicle, and may be implemented for automotive and non-automotive applications alike. Moreover, only select components of the motor vehicle and fastener assemblies are shown and described in additional detail herein. Nevertheless, the vehicles and fasteners discussed below may include numerous additional and alternative features, and other available peripheral components, for carrying out the various functions of this disclosure.

Automobile 10 of FIG. 1 includes a vehicle body 12 that is erected on a rigid vehicle frame 20, for example, as either a body-on-frame or a unibody construction in a three-box configuration. Front and rear road wheels 11 are operatively attached, e.g., via individual corner assemblies, to the vehicle frame 20, which is represented in FIG. 1 by a driver-side A-pillar. In order to propel the vehicle, the road wheels 11 are driven by a prime mover 18, which may be in the nature of an internal combustion engine assembly and/or one or more electric traction motors. Located aft of a forward compartment (e.g., engine bay) and forward of a rear compartment (e.g., vehicle trunk) is an interior passenger compartment 16 of the vehicle body 12 that seats and safeguards the vehicle occupants. Although depicted as a sedan-type passenger vehicle with a three-box configuration, the vehicle 10 may take on innumerable vehicle types and vehicle-body configurations.

A rigid roof structure 14 generally delimits the upper extent of the passenger compartment 16, shielding the driver and passengers from rain, snow, ultraviolet (UV) light, and other elements. In accord with the illustrated example, the roof structure 14 is generally composed of laterally spaced roof rails 22 that are interconnected with longitudinally spaced forward and rear roof headers (not visible) and one or more cross-car roof bows 26 (see inset view). The roof rails 22, headers, and bow(s) 26 cooperatively provide subjacent support for a roof panel 24, which may be optically transparent, translucent, opaque, or combinations thereof. The roof structure 14, including the rails 22, headers, bow(s) 26, and panel 24, extends over and across the upper boundary of the passenger compartment 16. As illustrated, the transparent roof panel 24 has a "panoramic" design in that it spans across the entire fore-aft length of the vehicle roof and, thus, provides occupants with a predominantly unobstructed view through the top of the vehicle 10.

Inset within FIG. 1 is a cross-sectional, side-view illustration of a vehicle roof bow 26 with a representative weldable fastener assembly, portrayed as a cover-protected, weld-on rack receiver nut 30, that is threadably mating with a complementary fastener, such as a roof rack bolt 28. Roof bow 26—provided as an example of a load-bearing structural member—is assembled from three discrete pieces: an elongated and contoured roof outer panel 32; an elongated and contoured roof inner panel 34 located underneath and inboard from the roof outer panel 32; and an elongated and contoured roof bow panel 36 sandwiched between the inner and outer panels 32, 34. Bottom surfaces of opposing lateral sides of the elongated roof outer panel 32 are joined, e.g., via laser spot welds or self-piercing rivets (SPR), to top surfaces of respective lateral sides of the roof bow panel 36. In the same manner, bottom surfaces of the opposing lateral sides of the roof bow panel 36 are each joined to a top surface of a respective lateral side of the elongated roof inner panel 34. Each panel 32, 34, 36 may be formed from stamped steel or aluminum sheet metal or may be molded from a high-strength polymer. While described herein with reference to a coupling mechanism for mounting a roof rack onto a vehicle roof structure, disclosed fastener assemblies may be welded to other vehicle structure, packaged at different vehicle locations, and/or employed for interconnecting alternative components.

Interposed between the roof outer panel 32 and the bow panel 36 is an elongated and substantially flat nut plate 38. In this example, the nut plate 38 is a sheet metal article that is welded to the underside surface of the roof outer panel 32 and machined with a series of bolt apertures 39 arranged at predefined weld nut interface locations. The weldable fastener assembly 30 is bipartite unit that is generally composed of a weld nut 40 with an open upper end thereof that is closed off by a protective cover 42. Disclosed features are similarly applicable to closed-end fasteners with blind-hole bores, such as the illustrated example, as well as open-end fasteners with through-hole bores. Moreover, disclosed fastener assemblies may comprise a single-piece construction or a multi-piece construction with two or more constituent parts.

The weld nut 40 is placed on a passenger compartment-facing underside surface of the nut plate 38 such that the open end of the weld nut 40 is aligned with a respective one of the bolt apertures 39. For a projection welding operation, the weld nut 40 is pressed against the nut plate 38 by counterposed working and counter-electrodes (not shown) of an electric resistance welding (ERW) system. The ERW electrodes press the weld nut 40 and plate 38 into tight engagement and weld the two together by delivering a suitable pulse of welding current through the abutting segments of the two components. Resistance to electrical current by weldable material in the weld nut 40 and plate 38 generates heat in the flow path of the current, thereby causing weldable material located at the joining region to melt. Upon cooling, the molten material solidifies and forms a weld joint. It should be appreciated that other forms of welding may be utilized to join a weldable fastener assembly to a desired structural member. Moreover, disclosed weldable fastener assemblies may be back-side mounted to an inboard surface of a structural member or may be front-side mounted to an outboard surface thereof.

As indicated above, weldable threaded fasteners may be joined to load-bearing support structures, for example, to provide attachment points for associated parts and subsystems. During pre-processing and welding, these weld-on fasteners may be exposed to contaminants from weld flash expulsion, electrolytic coating via an electrolytic plating operation (ELPO), and paint runoff. For weld nuts with internally threaded bores, these contaminants may prevent a mating bolt from securely threading into the weld nut shank. To prevent the unwanted ingress of contaminants during the manufacturing process, a thin protective cover closes off and, optionally, seals the bolt-receiving weld nut hole. The protective cover is designed to survive associated welding, coating, and painting operations yet be readily pierced by a mating fastener when inserted into the weld nut.

Figure 2:
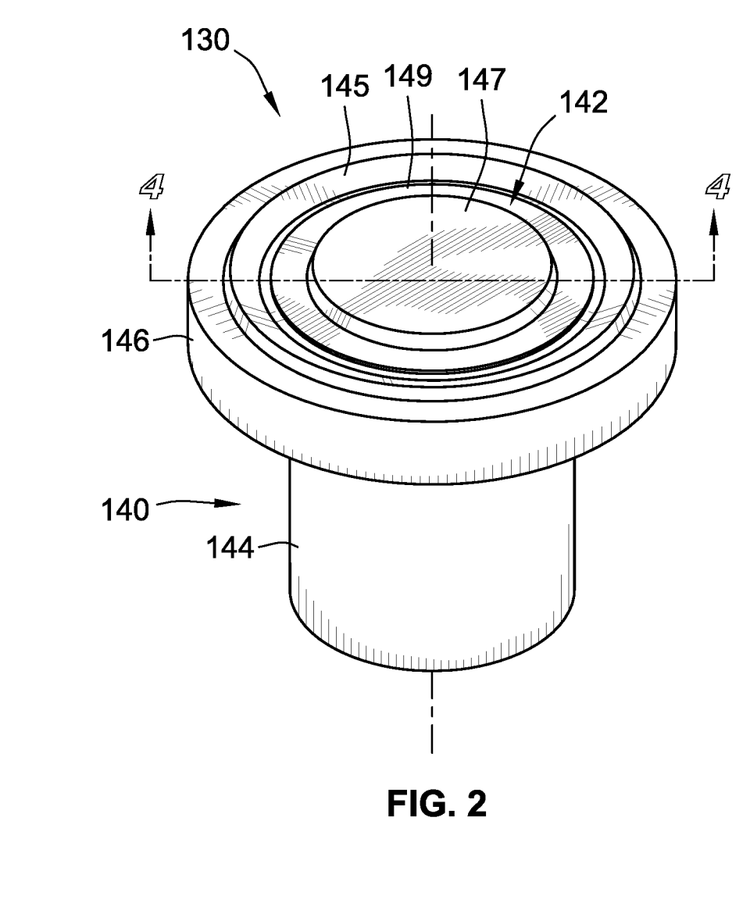
FIG. 2 is a side, perspective view illustration of a representative weld-on nut with a protective cover in accordance with aspects of the present disclosure.

Presented in FIGS. 2-5 are different examples of weldable fastener assemblies with protective coverings in accord with aspects of the disclosed concepts. Turning first to FIG. 2, there is shown a weldable fastener assembly 130 that is composed of or, in at least some embodiments, consists essentially of a weld-on fastener 140 and a resilient protective cover 142. In accord with the illustrated example, the fastener 140 is a weld nut with an elongated stem or shank 144 and a mounting base or flange 146. The shank 144 is portrayed in FIGS. 2 and 3 as a hollow right-circular cylinder with an internally threaded, countersunk bore 141. An upper-most (first) end of the shank 144 includes a fastener hole 143 through which is received a mating fastener, such as bolt 28 of FIG. 1. While shown as an elongated cylinder with a circular transverse cross-section and a threaded bore, shank 144 may take on other closed-curve and polygonal cross-sections, may employ elongated and short-shank configurations, and/or may comprise plain-bore designs.

Fastener flange 146 of FIG. 2 obtrudes transversely from the shank 144 and acts as a mounting interface for coupling the weldable fastener assembly 130 to a support structure, such as nut plate 38 of FIG. 1. As shown, the flange 146 is a rectangular toroid that projects radially outward from the upper-most end of the shank 144. The flange 146 extends continuously around and circumscribes the fastener hole 143. For alternative designs, the flange 146 may be a discontinuous structure with multiple mounting projections that radiate outward from the shank 144 and are spaced circumferentially around the fastener hole 143. Moreover, the flange 146 is not per se limited to a circular plan-view profile; rather, the flange 146 may take on other geometric configurations without departing from the intended scope of this disclosure.

The fastener flange 146 is coated with or formed, in whole or in part, from a weldable material. By way of non-limiting example, the fastener 140—including shank 144 and flange 146—may be integrally formed as a single-piece, unitary structure from the weldable material. To this end, the protective cover 142 may be formed as an integral component of the single-piece fastener 140. The weldable material may be a fusible base metal, such as a mild steel, a stainless steel, or a high-strength steel. In a more specific, yet non-limiting example, the fastener is cast and machined from ISO 898-2(8) carbon steel. A top surface of the fastener flange 146 may be coated with a layer of heat-curable or pressure-sensitive adhesive to assist with placement and alignment of the weldable fastener assembly 130 on a load-bearing structural member.

Figure 3:
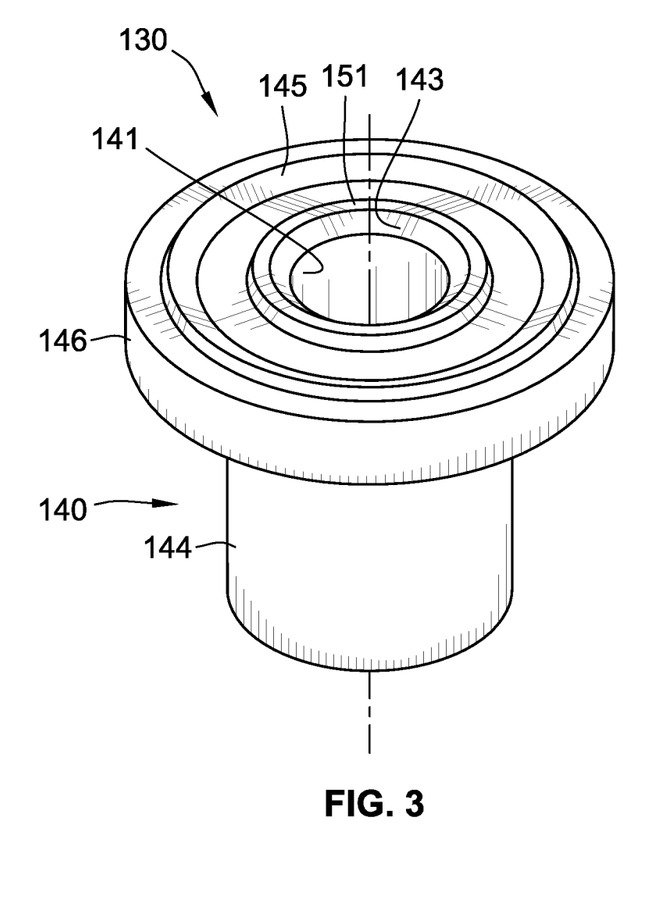
FIG. 3 is a side, perspective-view illustration of the weld-on nut of FIG. 2 with the protective cover pierced or removed from the nut flange.

To facilitate welding of the fastener assembly 130 to a load-bearing structural member, the weld-on fastener 140 is provided with an annular weld projection 145 that protrudes axially from the panel-facing, uppermost (axial) face of the fastener flange 146. Weld projection 145 may take on a continuous ring shape that is concentric with the flange 146 and opening 143, as shown in FIGS. 2 and 3, or may instead comprise a circular array of discrete protuberances that are circumferentially spaced from one another around the fastener hole 143. The weld projection 145, which has a triangular cross-section (best seen in FIG. 4), extends continuously around and circumscribes the fastener hole 143. When the fastener assembly 130 is pressed against an interface surface of a load-bearing structure, the weld projection 145 may be the only portion of the fastener assembly 130 that initially contacts the structure. Weld projection 145 serves as a filler metal that melts and fuses during the welding process. For a high-amperage AC resistance welding operation, the projection 145 creates a "high resistance" interface point in the electrical circuit created by the counter-acting weld electrodes that exaggerates localized heating at the projection 145. In so doing, the current output by the ERW system causes the projection 145 to melt and fuse without melting the shank 144 or its internal threading.

Protecting the internal bore 141 of the weld-on fastener 140 is a protective cover 142 that mounts onto the flange 146 and shields the fastener hole 143. The protective cover 142 of FIGS. 2 and 4 has a disc-shaped body with a central hub 147 and a cover flange 149 projecting radially outward from the hub 147. Both the central hub 147 and the cover flange 149 have circular plan-view profiles and are concentrically aligned with the fastener flange 146 and opening 143. Alternative applications in which the fastener flange 146 takes on a shape or size that is different from what is shown in the drawings may necessitate that the protective cover 142 takes on a correspondingly modified shape/size.

Figure 4:
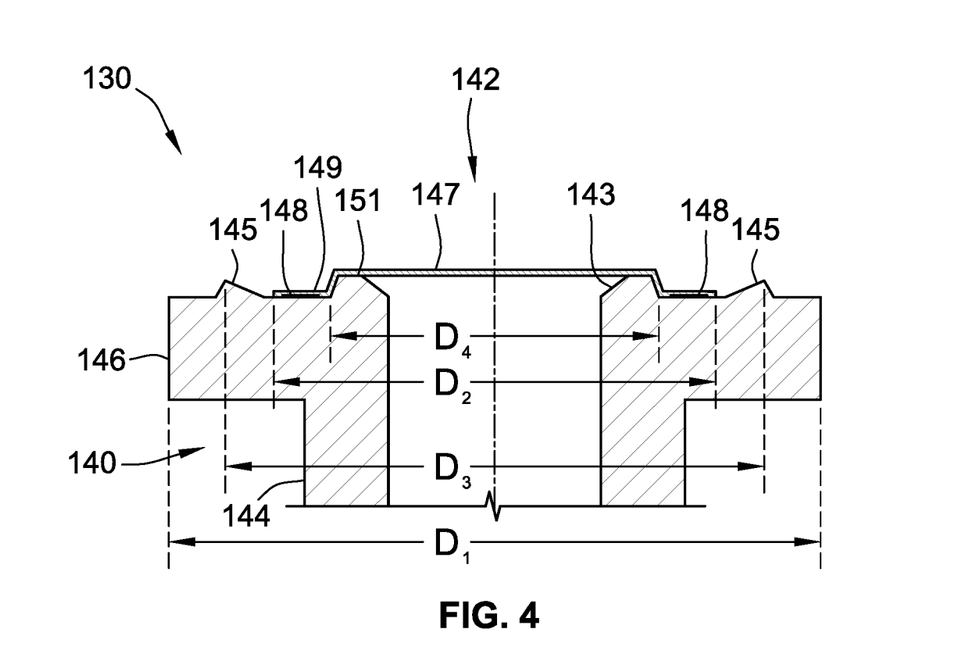
FIG. 4 is a side-view illustration of the representative weld-on nut and protective cover of FIG. 2 taken in cross-section along line 4-4.

In addition to concealing the fastener hole 143, the protective cover 142 may also act to seal the open end of the fastener bore 141 to provide further protection for the internal threads of the fastener 140. For instance, the cover flange 149 may sit flush against and, optionally, bond to the uppermost axial face of the flange 146 via a layer of adhesive 148 (FIG. 4). In the illustrated example of FIGS. 2-4, the fastener flange 146 has a flange (first) diameter $D_1$ (or width, for non-circular designs) and the protective cover 142 has a cover (second) diameter $D_2$ (or width) that is less than the flange diameter $D_1$. At the same time, the annular weld projection 145 has a projection (third) diameter $D_3$ that is less than the flange (first) diameter $D_1$ yet is greater than the protective cover's diameter $D_2$. Also protruding axially from the uppermost axial face of the fastener flange 146 is an annular rim 151 that is coterminous with and circumscribes the fastener hole 143. The annular rim 151 has a rim (fourth) diameter $D_4$ that is less than the diameters $D_1$, $D_2$, $D_3$, of the flange 146, the cover 142, and the weld projection 145, respectively. In this instance, the central hub 147 of the protective cover 142, nests therein, extends across, and covers the annular rim 151; the cover flange 149 is thus interposed between the weld projection 145 and the annular rim 151.

The protective cover 142 is frangible and formed, in whole or in part, from a thermally resilient material that is able to withstand the welding temperature at which the flange's weldable material melts, e.g., without liquefying or plasticizing, yet be readily removed or punctured, e.g., by insertion of a mating fastener. As used herein, the term "frangible" may be defined to include its ordinary and customary meaning within the art, such as a structure that is readily or easily broken or a structure that, through deformation, tends to break or fragment rather than deform elastically or retain its cohesion as a single object. The cover material of the protective cover 142 may include polyamide, aluminum, steel, coated or alloyed aluminum or steel, and/or polytetrafluoroethylene (PTFE). The protective cover 142 may be a thin foil, sheet, membrane, or tape, for example, with a thickness of about 2 mil to about 8 mil (approximately 0.05-0.20 mm) or, in at least some embodiments, less than about 4 mil (0.10 mm). In accordance with the foregoing parameters, the protective cover 142 does not melt or significantly degrade when the fastener flange 146 is welded along weld projection 145 to an adjoining support structure yet is easily punctured in general assembly when an operator drives a fastener into the covered open-end weld nut.

Rather than employing a discrete or disposable component that is added to and/or disposed of during vehicle assembly, the protective cover 142 of FIG. 2 is a part-of-assembly (POA) component that is securely attached to the fastener 140, e.g., during fabrication of the weldable fastener assembly 130. As an example, the protective cover 142 may be mounted directly onto the flange 146 via an adhesive, a crimp, a tap weld, and/or a clinch joint. For at least some embodiments, the protective cover 142 may be characterized by a lack of threads or fasteners yet have a direct physical coupling to the flange 146. It may be desirable that the geometry of the protective cover 142 mimic the topology of the uppermost surface of the fastener flange 146.

Figure 5:
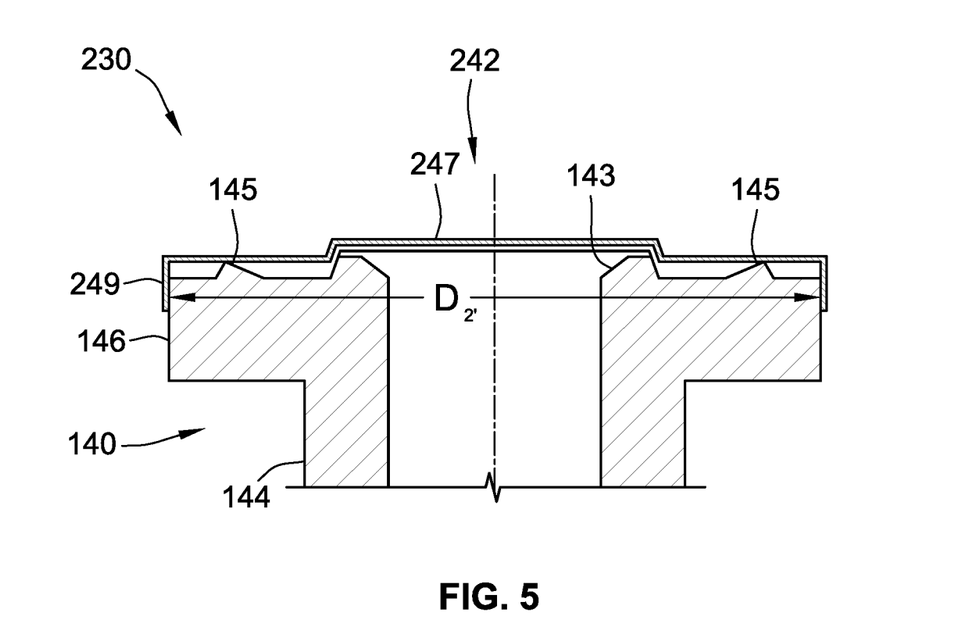
FIG. 5 is a cross-sectional, side-view illustration of a weld-on nut with another representative protective cover in accord with aspects of the disclosed concepts.

Turning next to FIG. 5, there is shown another example of a weldable fastener assembly 230 in accord with aspects of the disclosed concepts. Although differing in appearance, it is envisioned that any of the features and options described above with reference to the weldable fastener assemblies 30 and 130 of FIGS. 1 and 2 can be incorporated, singly or in any combination, into each other and into the weldable fastener assembly 230 of FIG. 5, and vice versa. As one example, the weldable fastener assembly 230 of FIG. 5 is a bipartite construction that includes a weld-on fastener 140 and a resilient protective cover 242. As another example of potentially overlapping features, the fastener 140 illustrated in FIG. 5 may be substantially identical to the fastener 140 of FIG. 4. Also similar to the protective cover 142 of FIG. 4, the protective cover 242 of FIG. 5 mounts directly onto the fastener flange 146 and covers the fastener hole 143.

By way of contrast, the protective cover 242 has a cup-shaped body with a central disc 247 and an annular cover rim 249 that project orthogonally from an outer perimeter of the disc 247. Both the central disc 247 and the cover rim 249 have circular plan-view profiles and are concentrically aligned with the fastener flange 146 and opening 143. As another point of demarcation over the cover 142 of FIG. 4, the protective cover 242 does not sit flush against the panel-facing axial face of the fastener flange 146. Rather, the central disc 247 is axially spaced from the uppermost surface of the fastener flange 146. In addition, the protective cover 242 has a cover diameter $D_{2'}$ (or width) that is greater than the diameter $D_1$ (or width) of the flange 242 such that the protective cover 242 extends across the entire uppermost axial face of the flange 146 and mounts directly to the outer diameter surface of the flange 146. As such, the protective cover 242 extends across and covers the annular weld projection 145.

For any of the disclosed weldable fastener assemblies, the protective covering and any adhesive thereof may "burn off" during the weld cycle so as to expose the weld projection and/or central bore. In addition, the protective cover may bridge the entire surface of the flange and/or hermetically seal thereto. As yet a further option, the protective cover may be fabricated from a "weld through" material through which weld projections are melted and coalesce with adjoining melt material.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A weldable fastener assembly, comprising:
   a fastener including a shank and a flange, the shank having a first end defining a fastener hole configured to receive therethrough a mating fastener, and the flange formed with a weldable material and projecting transversely from the shank, wherein the flange includes opposing first and second axial faces, an annular rim protruding axially from the first axial face and circumscribing the fastener hole, and an annular weld projection protruding axially from the first axial face and circumscribing the annular rim; and
   a protective cover attached to the flange and covering the fastener hole, wherein the protective cover includes a frangible foil formed with an aluminum material configured to withstand a welding temperature at which melts the weldable material of the flange, wherein the protective cover is circumscribed by the annular weld projection and extends across and covers the annular rim.

2. The weldable fastener assembly of claim 1, wherein the flange has a first diameter or width and the protective cover has a second diameter or width less than the first diameter or width.

3. The weldable fastener assembly of claim 2, wherein the flange is a toroid with an outer diameter surface adjoined with and connecting the first and second axial faces, and wherein the protective cover sits flush against the annular rim.

4. The weldable fastener assembly of claim 2, wherein the annular weld projection has a third diameter the second diameter of the protective cover is less than the third diameter of the annular weld projection.

5. The weldable fastener assembly of claim 4, wherein the annular rim has a fourth diameter less than the second and third diameters.

6. The weldable fastener assembly of claim 1, wherein the protective cover is mounted directly to the flange via an adhesive, a crimp, a tap weld, and/or a clinch joint.

7. The weldable fastener assembly of claim 1, wherein the protective cover consists essentially of the frangible foil formed from the aluminum material.

8. The weldable fastener assembly of claim 1, wherein the frangible foil has a thickness of about 2 mil to about 8 mil.

9. The weldable fastener assembly of claim 1, wherein the fastener, including the shank and the flange, is integrally formed as a single-piece structure from the weldable material.

10. The weldable fastener assembly of claim 1, wherein the fastener is a weld nut and the shank is an elongated cylinder with an internally threaded bore.

11. The weldable fastener assembly of claim 10, wherein the flange is a toroid projecting radially outward from the first end of the shank and extending continuously around the fastener hole.

12. A motor vehicle comprising:
a vehicle body with a load-bearing structural member;
a prime mover attached to the vehicle body and operable to propel the motor vehicle; and
a weldable fastener assembly including:
a weld nut including an internally threaded shank and a toroidal flange, the shank having a first end defining a fastener hole configured to receive therethrough a mating bolt, and the flange projecting radially outward from the first end of the shank and formed with a weldable material welded to the load-bearing structural member, wherein the flange includes opposing first and second axial faces, an annular rim protruding axially from the first axial face and circumscribing the fastener hole, and an annular weld projection protruding axially from the first axial face and circumscribing the annular rim; and
a protective cover mounted directly to the flange and covering the fastener hole, wherein the protective cover consists essentially of a frangible foil formed entirely from an aluminum material configured to withstand a welding temperature at which the weldable material melts and be pierced by insertion of the mating bolt into the fastener hole, wherein the protective cover covers the annular rim and is circumscribed by the annular weld projection.

13. A method of manufacturing a weldable fastener assembly, the method comprising:
forming a fastener including a shank and a flange, the shank having a first end defining a fastener hole configured to receive therethrough a mating fastener, and the flange formed with a weldable material and projecting transversely from the shank, wherein the flange includes opposing first and second axial faces, an annular rim protruding axially from the first axial face and circumscribing the fastener hole, and an annular weld projection protruding axially from the first axial face and circumscribing the annular rim; and
attaching a protective cover to the flange to thereby cover the fastener hole, wherein the protective cover includes a frangible foil formed with an aluminum material configured to withstand a welding temperature at which melts the weldable material of the flange, wherein the protective cover covers the annular rim and is circumscribed by the annular weld projection.

14. The method of claim 13, wherein the flange has a first diameter or width and the protective cover has a second diameter or width less than the first diameter or width.

15. The method of claim 14, wherein the flange is a toroid with an outer diameter surface adjoined with and connecting the first and second axial faces, and wherein the protective cover sits flush against the annular rim.

16. The method of claim 13, wherein the protective cover consists essentially of the frangible foil formed with the aluminum material.

17. The method of claim 13, wherein the frangible foil has a thickness of about 2 mil to about 8 mil.

18. The method of claim 13, wherein the fastener, including the shank and the flange, is integrally formed as a single-piece structure from the weldable material.

19. The method of claim 13, wherein the fastener is a weld nut and the shank is an elongated cylinder with an internally threaded bore.

20. The method of claim 13, wherein attaching the protective cover to the flange includes mounting the protective cover directly to the flange via an adhesive, a crimp, a tap weld, and/or a clinch joint.

* * * * *